United States Patent
Dhir et al.

(12)

(10) Patent No.: US 6,553,113 B1
(45) Date of Patent: Apr. 22, 2003

(54) SYSTEM AND METHODS FOR CALL DECISIONING IN A VIRTUAL CALL CENTER INTEGRATING TELEPHONY WITH COMPUTERS

(75) Inventors: Nitin Dhir, Wilmington, DE (US); Djovana Shkreli, Westerville, OH (US); Thorp Foster, Landenberg, PA (US)

(73) Assignee: First USA Bank, NA, Wilmington, DE (US)

( * ) Notice: Subject to any disclaimer, the term of this patent is extended or adjusted under 35 U.S.C. 154(b) by 0 days.

(21) Appl. No.: 09/349,960

(22) Filed: Jul. 9, 1999

(51) Int. Cl.[7] .............................. H04M 3/00; H04M 5/00

(52) U.S. Cl. ............................ 379/265.02; 379/266.01

(58) Field of Search ................. 379/265.01–265.14, 379/266.01–266.1, 309, 219, 220.01

(56) References Cited

U.S. PATENT DOCUMENTS

| | | | | | |
|---|---|---|---|---|---|
| 5,414,754 | A | * | 5/1995 | Pugh et al. ............ | 379/204.01 |
| 5,452,350 | A | * | 9/1995 | Reynolds et al. ....... | 379/112.01 |
| 5,530,744 | A | * | 6/1996 | Charalambous et al. ................. | 379/112.05 |
| 6,052,460 | A | * | 4/2000 | Fisher et al. ........... | 379/265.12 |
| 6,064,973 | A | * | 5/2000 | Smith et al. ................. | 705/7 |
| 6,215,783 | B1 | * | 4/2001 | Neyman ................. | 370/353 |

OTHER PUBLICATIONS

"Innovative Call Center Solutions" sales brochure materials (undated) by Center Force Technologies distributed at Nov. 1999 conference (21 pages).

Rule 132 Declaration by Inventor Djovana Shkreli dated Jan. 6, 2000 (submitted herewith).

Rule 132 Declaration by Inventor Thorp Foster dated Jan. 10, 2000 (submittd herewith).

* cited by examiner

Primary Examiner—Benny Q. Tieu
(74) Attorney, Agent, or Firm—Hunton & Williams (57) ABSTRACT

An apparatus and methods for a call routing system is disclosed whereby the call routing service provider is associated with a series of partners. By providing a system supporting not only the main user, but also the partners, efficiencies are gained through cost-spreading. Agents can be qualified to field calls for multiple business entities. Cross-selling and proactive servicing based on caller demographic and profile data can be effectuated. The system employs a centralized or global bank of shared Interactive Voice Response (IVR) units so that unnecessary post-routing and call site interflow are reduced. The system comprises a central server system that interfaces with a long distance provider so that route requests are received, caller data is retrieved from one or more databases, routing and handling strategies are developed, load balancing is effectuated, and calls are appropriately routed to one of a plurality of geographically separated call center systems with queues staffed by agents. Each call center system is designed to support various queues, and agents may be qualified or assigned to various queues based on their skill sets and skill levels.

21 Claims, 10 Drawing Sheets

SYSTEM AND METHODS FOR CALL DECISIONING IN A VIRTUAL CALL CENTER INTEGRATING TELEPHONY WITH COMPUTERS

FIELD OF THE INVENTION

The present invention relates generally to a system and method for routing phone calls in a service center that integrates telephony with computers to provide a positive and personalized service environment that increases caller recognition provides cross-selling benefits through proactive servicing and spreads cost by supporting partners associated with the call center provider.

BACKGROUND OF THE INVENTION

It is increasingly common that consumers seek service from business concerns using the telephone. For example, a consumer seeking to place an order, schedule a delivery, file a complaint, or query an account balance may place a call to a centralized number provided by a business concern. It is well known that businesses often provide such numbers as so-called toll-free "800" numbers or the like.

Such toll free sites may be staffed by a series of agents who have been trained in customer service. While most agents will have generalized training and knowledge in dealing with customers, they typically have different levels of experience and training with regards to particular skill sets. For example, certain agents will have extensive experience with one type of product or transaction, while other agents will have experience with different products or transactions. Thus, agents may have different skill sets. Two agents may have familiarity with a given product or transaction, but may have a different level of skill for the given item. Thus, agents may have different skill levels for a given skill set.

Additionally, certain agents may have specialized skill sets not readily adapted to training, but still very important to certain customers. For example, some agents may have fluency in certain languages, such as Spanish or French.

Turning to the other side of the customer service interaction, each customer may need a different type of service or transaction and, moreover, each customer may have certain other non-transaction specific needs. For example, in the context of a credit card provider, one customer may seek to execute a balance transfer from one card account to another. A second customer may seek to increase his/her credit limit. Thus, these two customers have different service needs. Consequently, each may need to be routed to a service specialist with the appropriate skill set, i.e., to execute a balance transfer or to process a credit card limit increase.

Some toll free sites are so-called "virtual call centers," whereby calls are routed to agents at call centers at different geographic locations. These systems have significant drawbacks in their ability to properly route calls. Often a customer's particular needs are not fully ascertained until after a call has been routed to a call site. It is not uncommon that a call will have to be rerouted to a different site because a qualified agent does not exist or is occupied at that site. In the example given above, the customer seeking a limit increase may be routed to a first site that has no available agents with that skill set. The result is that the call routing system must "pull back" the call to reroute it to a second site. This ties up system resources (e.g., ports at a peripheral device at the first call site) and often results in customer dissatisfaction. This problem, referred to as "site interflow," is a significant drawback in conventional systems.

Having routed the call to a second site with an agent qualified to execute limit increases, the call routing system might then learn that this customer requires an agent with fluency in Spanish. The call routing system may learn this when the customer first talks with an agent. Or the customer may be first be routed to a "front-end" interactive voice response unit (IVR or VRU) at the call site. The customer may then enter digits in response to a menu asking whether the customer has special language requirements. In this example, the call routing system may now be required to route the customer to a third call site because the second site has no agent fluent in Spanish and also qualified to execute limit increases. Again, system resources are tied up and the customer is may be further irritated by the delay in servicing the call.

In short, conventional systems' inability to route calls to the best agent on the "first pass" results in two significant drawbacks. First, system resources are used suboptimally, resulting in significant costs for call routing systems that may have to handle thousands of calls per hour. Second, customer satisfaction is not maximized, resulting in lost accounts and sales. In a modem economy where service is the hallmark of successful enterprises, this is a significant disadvantage.

Another disadvantage of conventional call routing systems is their cost. Implementing a virtual call center may require costly hardware and software in the form of a central routing controller server, interexchange (IXC) long distance interface, administrative work stations, various peripherals such as automatic call distributors (ACDs) and primary branch exchange units (PBXs), and hardware for the network interface such as for a Wide Area Network (WAN). There are also significant costs associated with the software necessary for interface with the IXC, toad balancing, data management, and network interfacing (e.g., WAN system administration). There are also significant costs for the human capital required, i.e., the money required to train and pay agents and call routing system support personnel.

The high cost of implementing and operating conventional virtual call routing schemes is a significant disadvantage that may prevent smaller, undercapitalized business concerns from creating virtual call center services.

Other problems and drawbacks also exist.

According to Andrews, et. al., U.S. Pat. No. 5,546,452, a generalized call routing system is disclosed having a central controller distributing calls to agent systems based on real time status information and generalized load balancing considerations. However, the Andrews system does not solve the problems described above, nor does it achieve some of the objects and provide many the advantages of the invention described below.

SUMMARY OF THE INVENTION

For these and like reasons, what is desired is a system and method of providing a call routing system providing a virtual call center configured with centralized IVR's so that customer calls are more efficiently routed to qualified advisors without undue rerouting and queues within a call site.

Accordingly, it is one object of the present invention to overcome one or more of the aforementioned and other limitations of existing systems and methods for providing a virtual call center.

It is another object of the invention to provide a virtual call center with a virtual call center provider that is associated with a series of partners so that costs are reduced and hardware/software and human resources are shared.

It is another object of the invention to provide a virtual call center with strategic decisioning logic relying on customer behavior data or profile in order to route callers in a fashion that increases customer satisfaction and revenue.

It is another object of the invention to provide a virtual call center with proactive servicing, whereby database information and strategic decisioning logic is employed to predict other services and products of interest to a caller so that the call can be routed accordingly.

To achieve these and other objects of the present invention, and in accordance with the purpose of the invention, as embodied and broadly described, an embodiment of the present invention comprises an apparatus and method for a call routing system supporting the virtual call center provider (e.g., the main business concern) and a series of associated partners. Costs of implementation and operation are spread amongst the users. The system employs one or more banks of centralized IVR's to permit customer input information to be gathered before call routing to call sites within the virtual call center network. Site interflow and post-routing requirements are reduced. The system employs decisioning logic based on customer behavior or profile data in order to provide routing strategies (where to send the call) and handling strategies (how should the agent handle the call once received). This strategic decisioning logic also generates routing strategies for so-called "proactive servicing," or routing based in part on predictions about other services or products of interest to a customer based on behavior or profile data.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objects and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which.

DETAILED DESCRIPTION OF THE INVENTION

As discussed in the Summary of the Invention, the present invention is directed to a method and apparatus for a call routing system that reduces post-routing site interflow and that supports multiple partners and proactive servicing through strategic decisioning.

Strategic decisioning generally refers to the concept of establishing informed routing strategies based on some combination of customer-supplied data, DNIS/ANI data, and customer profile behavior data to improve caller satisfaction, reduce interflow and provide proactive servicing and cross-selling.

Overview of the System

Figure 1:
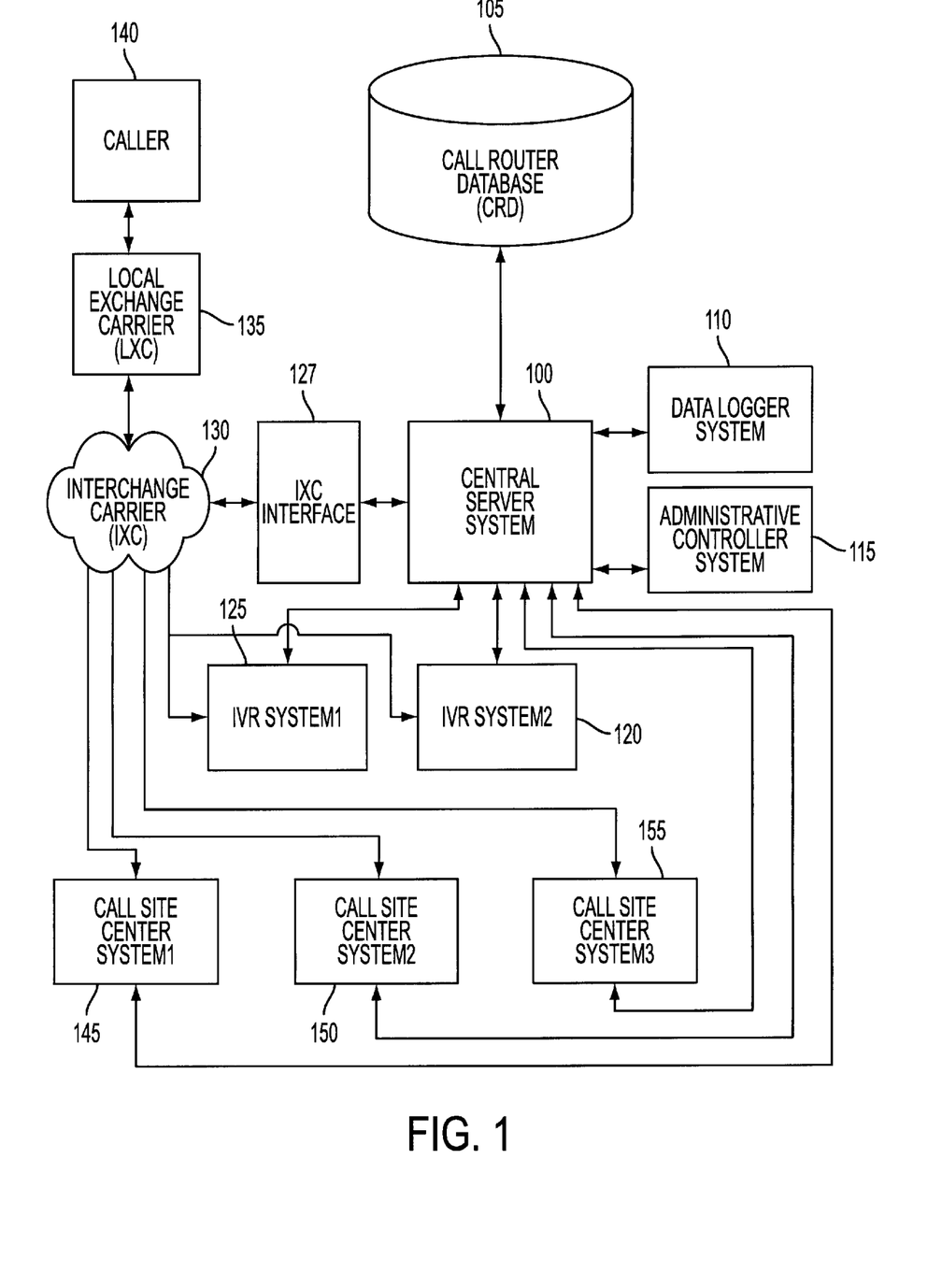
FIG. 1 is a block diagram of the call routing system according to an embodiment of the invention, including a central server system, IVR's, call site centers, data logger system, administrative controller system, database, IXC and IXC interface, local exchange and call originating site.

FIG. 1 depicts an overview of the system, according to an embodiment of the present invention, including central server system 100; data logger system 110; administrative controller system 115; call router database 105; IVR system1 125; IVR system2 120; call site center system1 145; call site center system2 150; call site center system3 155; IXC interface 127; interexchange carrier (IXC) 130; local exchange carrier 135; and caller 140.

Central server system 100 comprises a server system for centralized control over the call routing in the call routing system. Generally, central server system 100 includes hardware and software for supporting system administration, database management, carrier network interface, and transmission/reception of data to/from the central IVR's (blocks 120 and 125) and call site center systems (blocks 145–155). In general, central server system 100 receives routing requests from interexchange carrier (IXC) 130. Central server system 100 processes routing requests, as well as other information, to issue a return route address to IXC 130 to control where a call is routed. As will be discussed in greater detail below, sometimes the return route address causes a call to be forwarded to an IVR system (e.g., pre-routing to IVR system1 125 or IVR system2 120), and other times the call is forwarded to one of the call site center systems (e.g., post-routing call site center systems 1–3, modules 145–155).

In one embodiment, central server system 100 comprises an Intelligent CallRouter™ (ICR) system marketed by Geo- Tel Communications for call routing to a plurality of peripherals at call centers. While not depicted in FIG. 1, one or more backup servers may be provided for purposes of redundancy to ameliorate or eliminate the effects of crashes, malfunctions and the like.

Regarding the communication between central server system 100 and the other system elements, the interface and protocol may comprise means familiar to those of skill in the art. The interface between system elements may be through direct connection or direct lines or may be over a network, such as the Internet, Wide Area Network (WAN), Local Area Network (LAN) or the like. In the preferred embodiment, call site center systems 1–3 (blocks 145–155) interface with central server 100 over a WAN. Regarding data format for non-voice data (such as real-time status information transmitted from peripherals to central server system 100), TCP/IP protocol is used, although departures therefrom remain within the spirit and scope of the invention.

Data logger system 110 comprises hardware and software for logging activity of the call routing system. For example, data logger system 110 may provide for the storage of records reflecting the path taken by every call entering the call routing system. Data logger 110 may store records reflecting activity levels of various peripherals, such as IVR's and call centers, so that system administration personnel can evaluate long term loading levels. Data logger system 110 may provide for storage of both short-term transactional data (see, e.g., FIG. 2, module 200) and long term historical data (see, e.g., FIG. 2, module 205).

Administrative controller system 115 may comprise a workstation or the like for administering and monitoring the call routing system. Administrative controller system 115 may be used to input new parameters or routing scripts to central server system 100. Administrative controller system 115 may be used to access data in order to generate reports reflecting activity on the call routing system, such as volume of calls, allocation of calls to various queues, rate of account recognition, site interflow rates and so forth.

Call router database (CRD) 105 comprises storage means for storing data for the call router system. CRD 105, discussed further below in connection with FIG. 2, may comprise any reliable storage technology, such as hard drives, CD-ROM, optical drives and so on. Generally, CRD 105 is accessed by central server system 100 in order to retrieve customer identification and profile or behavior data in order to generate routing strategies and return addresses. CRD 105 is also controlled by central server system 100 to store transaction and history data reflecting activity on the call routing system.

IVR system1 125 and IVR system2 120 collect information from callers (e.g., using touch-tone activated voice menus) in order to route calls to the proper target, such as to a qualified agent at a queue at a call site. In the preferred embodiment, calls are first forwarded (i.e., pre-routed) to one of said IVR systems. Callers can receive automated servicing and access to their accounts using the touch-tone controlled menus. Alternatively, callers seeking servicing by a live agent can "dial out" by entering "#" or the like. In that event, additional information can be received in order to recognize the proper account and provide the best return route address to IXC 130. In this embodiment, once the return route address (e.g., for post-routing) is determined by central server system 100, the call may be returned from the IVR to IXC 130 by using a technology such as so-called "take back and transfer" (TNT) technology supported by MCI Corp. Once the call is returned to IXC 130, it is routed to the proper target in accordance with the return route address. IVR system1 125 is discussed further in connection with FIG. 4.

Call site center systems 1–3 (blocks 145–155) comprise call sites for receiving calls forwarded by IXC 130. Generally, said call sites will comprise one or more so-called peripherals capable of receiving calls, such as local VRU's, PBX's (Private Branch Exchange), and ACD's (Automatic Call Distributors). Said call sites generally include agents and agent workstations for human-assisted call processing, further discussed in connection with FIG. 3.

IXC interface 127 represents hardware/software that may be required to convert data transmitted between IXC 130 and central server system 100. Long distance carriers may have data formats (e.g., for the route request and return address) that differ among long distance providers (e.g., MCI™ v. Sprint™) and that may require conversion into a format usable by central server system 100. Broadly speaking, IXC interface 127 represents the interface that permits the integration of computers and telephony (often referred to as CTI or computer telephony integration) for the call routing system.

IXC 130 represents the long distance carrier network that is controlled by central server system 100 to route calls to call sites and queues at the different geographic locations. While not depicted in FIG. 1, IXC 130 may further comprise a data access point (DAP) representing the point or node in the long distance switching network that receives return route address data to determine call destination.

Local exchange carrier (LXC) 135 represents that local phone network receiving a customer's call in a local area for forwarding to IXC 130. For example, a customer calling a toll-free 800 number is routed through his/her local phone network to the long distance network, IXC 130.

Caller 140 represents the caller originating a call that is routed through the call routing system.

The Call Router Database

Figure 2:
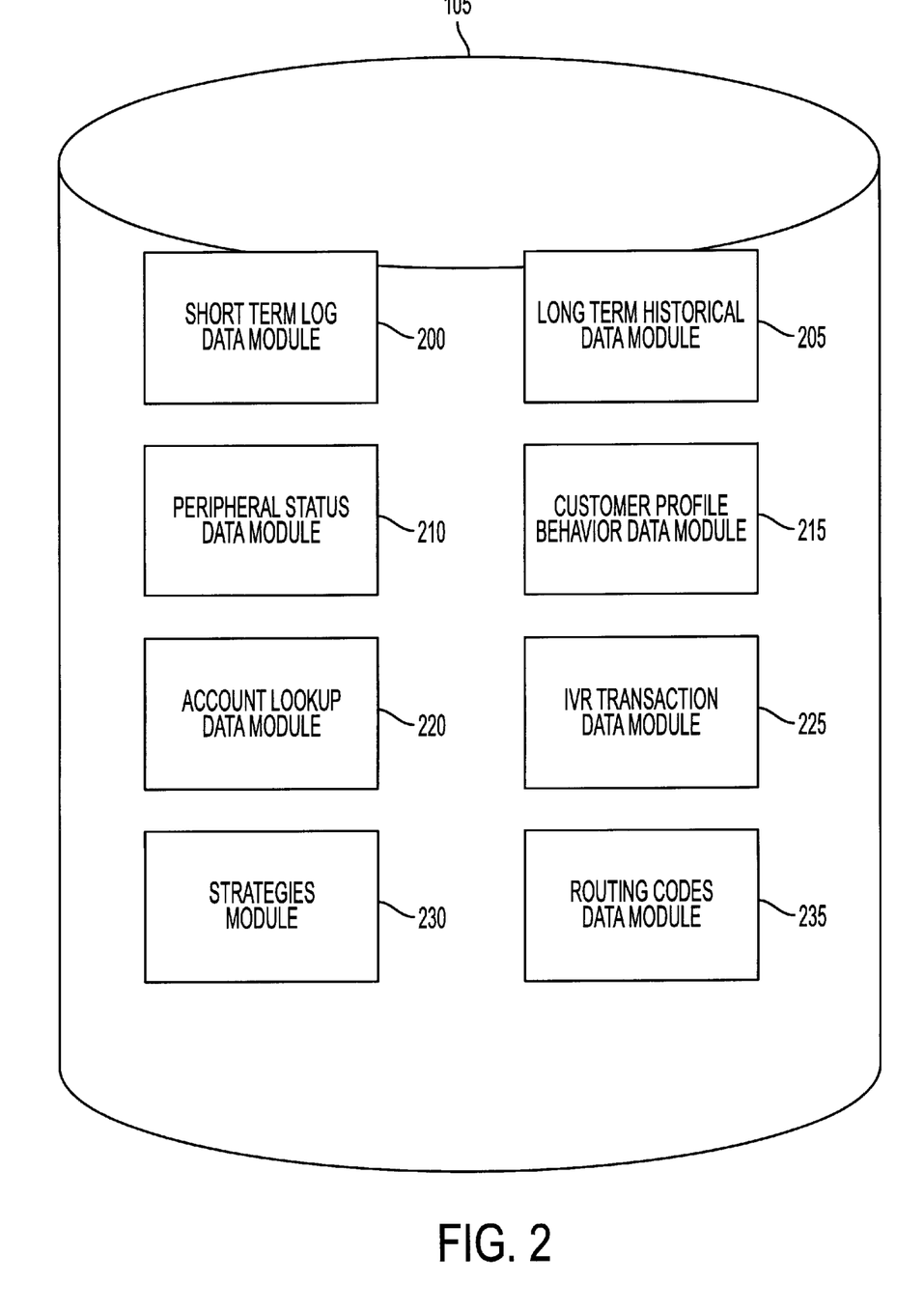
FIG. 2 is a block diagram according to an embodiment of the invention illustrating data that may be stored in a call router database.

FIG. 2 further illustrates CRD 105, which comprises the data maintained by the call routing system, including short term log data module 200; long term historical data module 205; peripheral status data module 210; customer profile behavior data module 215; account lookup data module 220; IVR transaction data module 225; strategies module 230; and routing codes data module 235.

At the outset, those of skill in the art will appreciate that the allocation of the data components of CRD 105, as depicted in FIG. 2, is functional and exemplary. The depicted modules could easily be combined or further divided without departing from the spirit of the invention. The purpose of FIG. 2 is to further explain the invention and is not intended to suggest that any particular database structure must be maintained.

Short term log data module 200 may comprise a module for storing short term data maintained by the call routing system, such as a log of transactions associated with recent calls. For example, if a call has been transferred out of a first site for some reason (e.g., a caller has an unsuccessful transaction with a given agent), short term data may be accessed to ensure that the call routing system reroutes the call to the proper target queue (e.g., not back to the very same agent). Long term historical data module 205 may comprise a module for storing data reflecting long term usage and trends in the call routing system. In one embodiment, the data in long term historical data module 205 may comprise the results of averaging or integrating the short term data. Long term historical data module 205 may store such data as call volume distribution (e.g., across call centers), average wait times, average service times, call distribution across queue types, and so forth.

Peripheral status data module 210 may be a module for storing real-time status information from various system components, such as peripherals at the call centers and IVR systems. Such status information may include information indicating which queues (or agents) are busy or available. Status information stored by peripheral status data module 210 may be used by the strategic decisioning and load balancing logic (discussed further below) performed by central server system 100 to establish viable route return addresses.

Customer profile behavior data module 215 may comprise a data module for storing data reflecting customer profiles and behavior. Strategic decisioning logic, especially as regards proactive servicing or cross-selling, relies on predictions of caller needs based on past purchasing behavior of consumers as well as general demographic data. For example, customers carrying high balances may generally be interested in balance transfers to accounts with lower interest rates. Customers who have engaged in transactions with a partner providing computer equipment may be interested in proactive servicing for Internet services or other computer-related products. Customers who have purchased airline tickets using their credit cards may be interested in special travel packages. Customers meeting certain demographic profiles, for example, particular age groups, may be interested in purchasing certain insurance packages. In general, customer profile behavior data module 215 contains the data that is used by the call routing system to make strategic decisioning predictions about caller needs.

Account lookup data module 220 may comprise a data module storing caller account and identification data. For example, if the caller is a credit cardholder calling in reference to his/her account, account lookup data module 220 can be accessed to retrieve transactions for the last month and other account data. Account lookup data module 220 may further comprise identification data of a caller, such as name, phone number, address, PIN number, and so forth. When a caller first calls, basic information such as calling number ID (number from which the call originates) and/or information submitted to an IVR (such as an account number and/or PIN ID) can be used to identify the caller in the first instance. This information can be further used to retrieve the proper account data for the caller. This process can be referred to as "account recognition". One objective of the instant invention is to maximize account recognition so that proper routing strategies can be established and customer satisfaction is maximized.

IVR transaction data module 225 may comprise a module containing transaction data from the IVR banks (see, e.g., FIG. 1, IVR system1 125 and IVR system2 120). In the preferred embodiment of the present invention, so-called centralized IVR's are employed within the call routing system network to secure additional data from a caller before routing to an individual call site. In this fashion, additional information may be secured from the caller so that the proper account is recognized and strategic decisioning logic and load balancing logic can be employed to route the call to the best target. This reduces unnecessary site interflow and post-routing that plagues conventional systems. IVR transaction data module 225 generally includes data collected from a caller when routed to an IVR, which may prompt the caller to select various options and enter touch-tone digits via menu selection.

Routing codes data module 235 comprises a data module with routing codes associated with particular accounts that correspond to particular routing strategies. For example, routing codes data module 235 may comprise routing codes that indicate that the customer for Account Number 123456 should receive proactive servicing for balance transfers or Internet services. As a result, when that customer calls the virtual call center and his/her account is recognized, routing codes data module 235 will be checked to ascertain whether this customer has been pre-designated for particular servicing. In one embodiment, the routing codes are derived by periodic processing of some combination of profile data from module 215 and/or account data from module 220. This periodic processing to create routing codes may be automated or may entail human intervention.

Strategies module 230 generally contains the logic or scripts for the routing strategies. Scripts refer to the language or set of commands employed by central server system 100 to determine a target site and/or target queue for a given call. In one embodiment, said scripts include logic for strategic decisioning (identifying candidate target queues for a given call) and load balancing (balancing the load across available resources). In the preferred embodiment, strategies module 230 contains the strategies corresponding to routing codes stored in routing codes data module 235.

Call Site Center System

Figure 3:
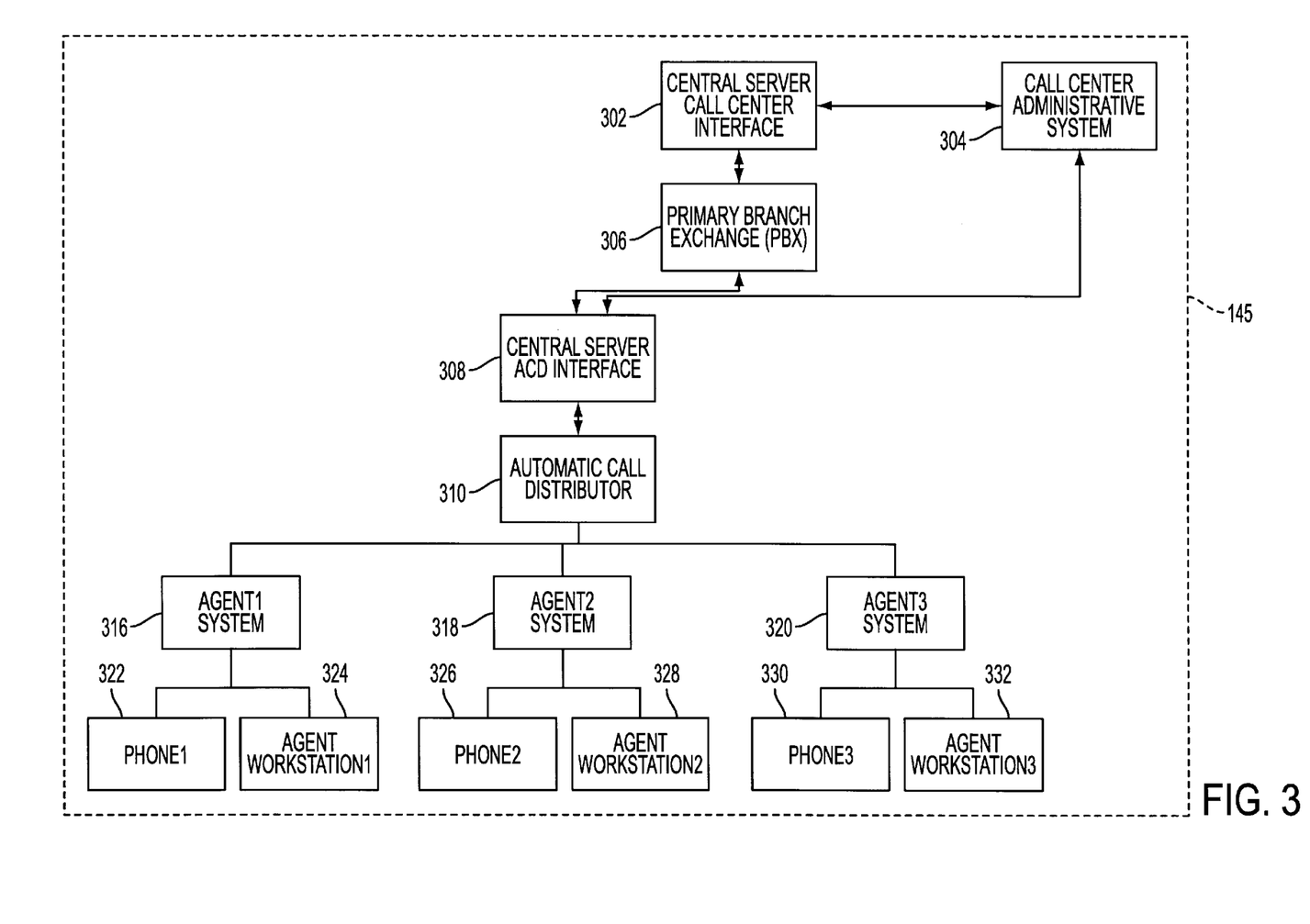
FIG. 3 is a block diagram according to an embodiment of the invention illustrating a call center for receiving calls routed by the call routing system.

FIG. 3 illustrates an exemplary embodiment of call site center system 145, including central server call center interface 302; call center administrative system 304; primary branch exchange (PBX) 306; central server ACD interface 308; automatic call distributor (ACD) 310; agent1 system 316; agent2 system 318; agent3 system 320; phone1 322; agent workstation1 324; phone2 326; agent workstation2 328; phone3 330; and agent workstation3 332. Call site center 145 may further comprise call site VRUs (not depicted), although the need for them is substantially obviated by the centralized VRU banks (modules 120–125) employed by the invention.

In the preferred embodiment, each call site center system interfaces with central server system 100 over a WAN, although those of ordinary skill will appreciate that the interface could encompass other packet-switched technologies for communication between remote systems, such via the Internet, World Wide Web, Internet Protocol Next Generation (IPng), Local Area Network (LAN) and the like. Central server call center interface 302 represents the hardware and software for the interface between call site center systems 145–155 and central server system 100 which, in the preferred embodiment, employs so-called TCP/IP data communications protocol.

Call center administrative system 304 may comprise a computer workstation or the like for administration of each call site center system. This system may be used to monitor activity at the call site center system, modify operating parameters, compile and print activity reports, and perform other administrative functions.

PBX 306 depicts a primary branch exchange device, know in the art, for routing incoming calls to local extensions at the site. As illustrated in FIG. 3, PBX 306 may route incoming calls to agents through ACD 310.

Central server ACD interface 308 represents software and hardware for ACD 310 to interface with central server system 100. ACD 310 is a programmable automatic call distributor device, know in the art, for routing incoming calls to so-called targets at the call center, here to the various agent systems. Agent1 system 316, Agent2 system 318 and Agent3 system 320 may comprise a plurality of agent systems for qualified agents to service calls. Each agent system may be comprised of one or more agents and a phone and workstation, as depicted by phone1 322/agent workstation1 324, phone2 326/agent workstation3 328, and phone3 330/agent workstation 332. The agent workstations may be used to display caller information to the agent, such as identification and account information, as well as handling strategy information forwarded by central server system 100. In the preferred embodiment, agents will "log-in" to those queues for which they qualify.

The IVR Banks

Figure 4:
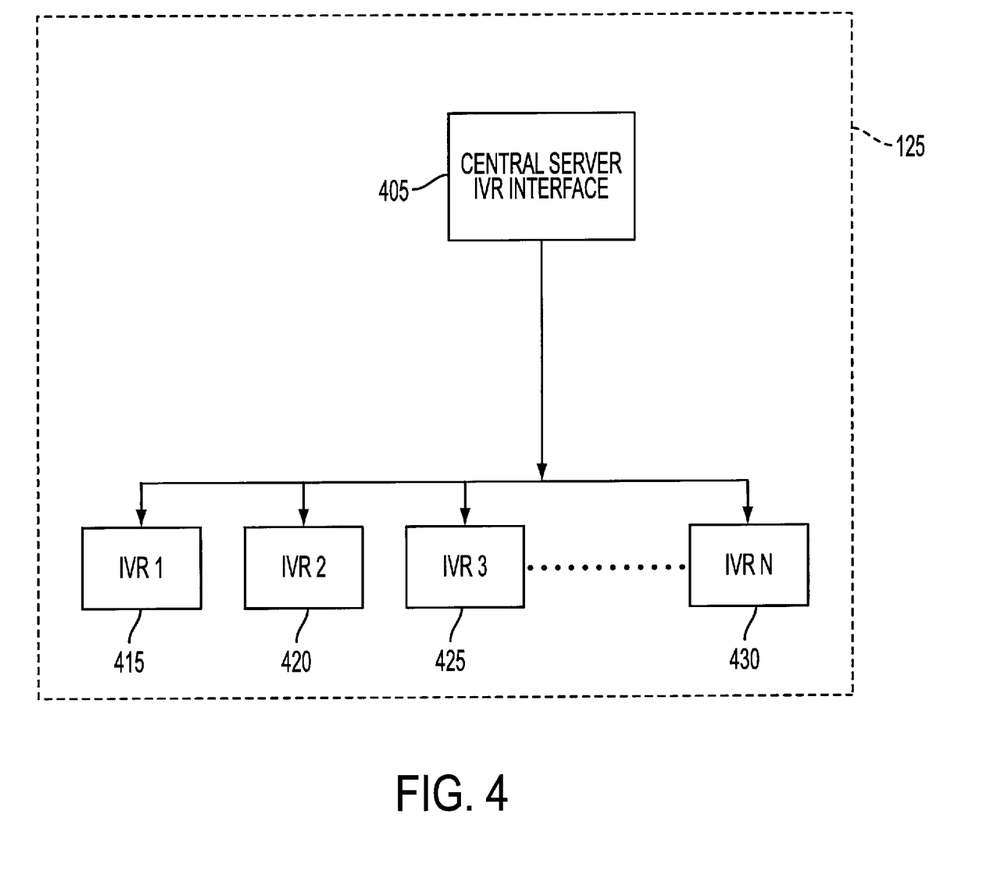
FIG. 4 is a block diagram according to an embodiment of the invention illustrating an IVR system, including a control server, interface and series of individual IVR's, for receiving caller information in order to facilitate proper routing.

The IVR (Interactive Voice Response Unit) systems, e.g., IVR system1 125, may comprise a series of IVR devices, as illustrated in FIG. 4. In the preferred embodiment, the call routing system comprises two centralized IVR banks comprising IVR system1 125 and IVR system2 120. In this exemplary embodiment, IVR system1 125 comprises central server IVR interface 405; and a series of individual IVR devices IVR1 415, IVR2 420, IVR3 425 and IVR N 430.

Central server IVR interface 405 represents hardware and software for interfacing the IVR banks with central server system 100. In the preferred embodiment, the data communications protocol is TCP/IP, although those of ordinary skill will appreciate that other formats may be used. Regarding load balancing, central server system 100 may load balance between IVR system1 125 and IVR system2 120. Status information regarding the operational states of the IVR's is forwarded from IVR system1 125 and IVR system2 120 for the purposes of load balancing so that the proper (pre)route return address can be computed (see, e.g., FIG. 2, module 225).

As touched upon previously, IVR system1 125 and IVR system2 120 are considered "system level" or centralized IVRs that improve the performance of the instant call routing system compared to conventional approaches. Conventional systems generally provide a central server for prerouting (from the long distance exchange to a target within the call router network, such as a call site) and post-routing (from the target to another node in the call router network). Conventional systems rely on limited information for pre-routing (such as originating call number and called number) so that it is not uncommon that upon arrival at the target device, a call must be forwarded out of a first call site to a second call site for proper servicing (the interflow problem) or to another target within the first call site (the re-routing problem).

By incorporating shared IVR systems within the call routing network (e.g., modules 120 and 125) before a call is forwarded to a local call site, additional information can be received so that it is more likely that the correct account is recognized and the proper routing strategy is computed. The effect is that the so-called hit-rate (% of calls properly routed) increases dramatically, costs are reduced, and revenues and customer satisfaction are improved.

Prior systems employed premises-based VRUs (at the call sites) or network-based VRUs. Premises-based VRU systems often result in suboptimal account recognition and site interflow problems. Network-based VRU systems sometimes referred to as "network level prompting," direct incoming calls to a VRU within the long distance carrier network (e.g., IXC 130, FIG. 1). Network level prompting may increase account recognition somewhat (over premises-based VRUs) because the customer provides additional information (via touch tone input) before the call is routed. There are significant disadvantages, however. First, there is no full access to the call router database (e.g., CRD 105) since the VRU is within the external long distance carrier network. Second, network level prompting VRU's generally do not provide full automated service and account access if the caller decides not to switch out of the automated system. It has been found that typically about fifty percent (50%) of calls terminate at the VRUs. Thus, the centralized VRUs of the present invention have the advantage of providing full access to the account data in the CRD database if the caller does not require human servicing. It has also been found that account recognition has increased from about 60% to approximately 78–85% in moving from a network level prompting virtual call center to one employing the centralized VRUs of the present invention.

Queuing and Partnering in the Call Routing System

Figure 5:
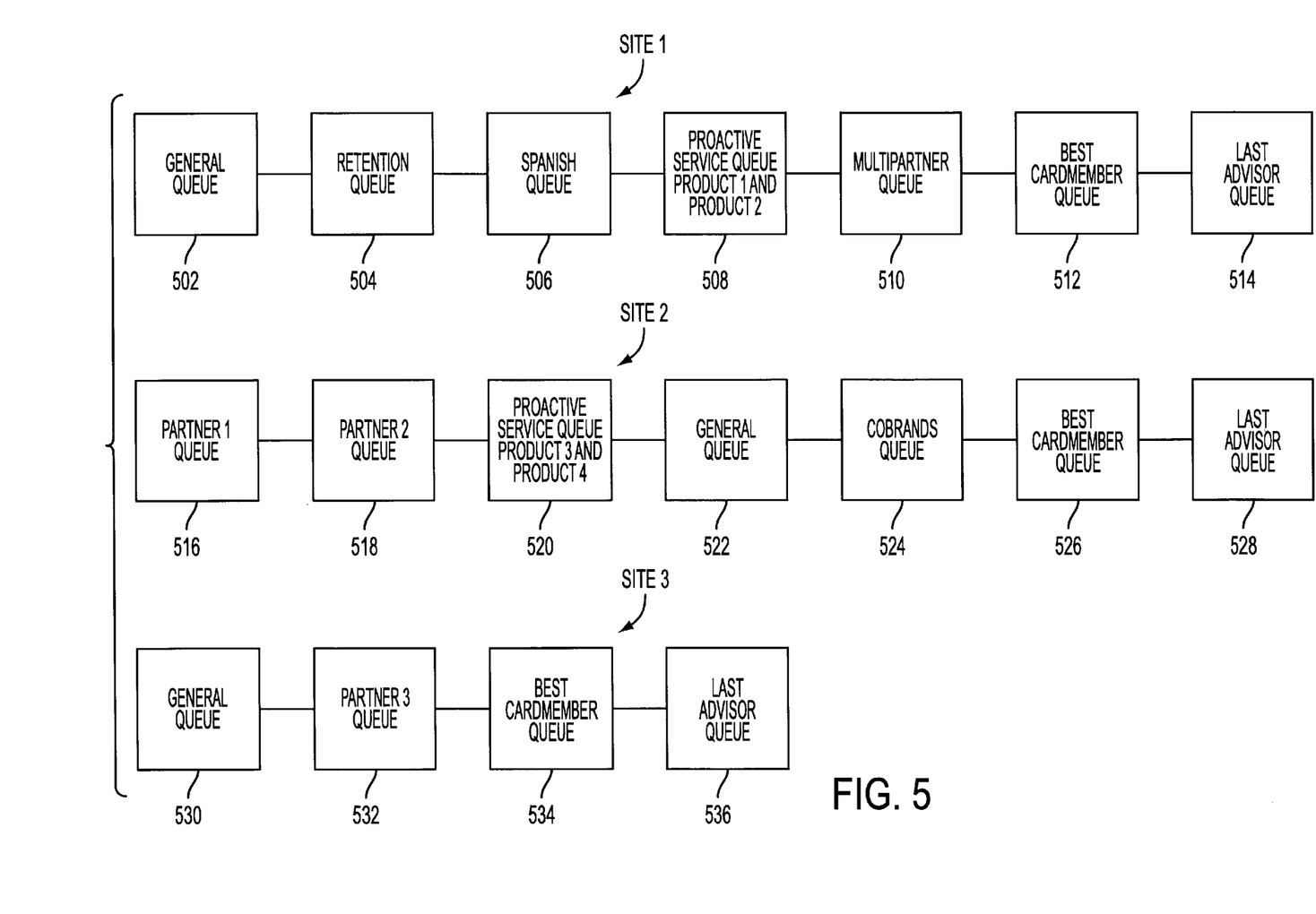
FIG. 5 is a block diagram according to an embodiment of the invention illustrating the concept of queue assignment at the call site centers.

FIG. 5 illustrates the concept of call queues supported by the call routing system. Queues represent categories of skill sets or subject matters that are supported by agents. Each call site center may support a variety of queues depending on the services provided by the virtual call center provider and associated partners. Agents may be qualified to support different queues (so-called multiple queue assignment or MQA) and may even have skill level designations to differentiate capability for a given queue. By way of example, a first agent may be qualified to support the general queue as well as a Spanish queue at skill level 2. Another agent, who happens to be more fluent in Spanish, may be assigned to the Spanish queue at skill level 1. Agents generally log in to the appropriate queues when they begin servicing calls, although some queue assignments may be automated (e.g., last advisor queue, discussed below).

FIG. 5 illustrates the queue concept for an exemplary embodiment of the call routing system. In the call routing system of FIG. 5, there are three call site centers, site 1, site 2, and site 3. Each site supports a series of different queues. Site 1 supports general queue 502 for so-called general service calls. In the preferred embodiment, where the virtual call center provider provides credit card services, general queue 502 provides general service associated with a cardholder's account, such as balance inquiries, disputed charges, lost or stolen card reports, and the like. Retention queue 504 represents a queue for retaining customers who may be terminating their account or whose service agreement term is near an end. Spanish queue 506 is provided to service callers requiring a Spanish-speaking agent. Proactive service queue product 1 and product 2 represents a queue assigned for proactive servicing or marketing associated with two designated products (or services). Multipartner queue 510 may be a queue for supporting several different partners as a consolidated queue. Best cardmember queue 512 represents a queue assigned for servicing valued callers, such as cardmembers with excellent payment histories or especially profitable accounts. Last advisor queue 514 is a queue assigned for routing a caller to the advisor who serviced him/her during the last call. For example, a caller engaged in an ongoing discussion regarding a disputed charge may prefer to deal with the agent familiar with the matter.

According to FIG. 5, another call site center system at site 2 comprises partner 1 queue 516 for servicing calls for a first partner, partner 2 queue 518 for servicing calls for a second partner, proactive service queue product 3 and product 4 520 (similar to block 508), general queue 522, cobrands queue 524 for servicing cobranded products or services, best cardmember queue 526, and last advisor queue 528. Yet another call site center system at site 3 comprises general queue 530, partner 3 queue 532, best cardmember queue 534 and last advisor queue 536.

The operation of the call routing system is such that data is stored (e.g., by call center administrative system 304) reflecting the various queues that each agent can support. Additionally, each agent logs in so that central server system 100 can perform the strategic decisioning and load balancing functions based on up-to-date information of agents (and their specialties) actually available.

Figure 6:
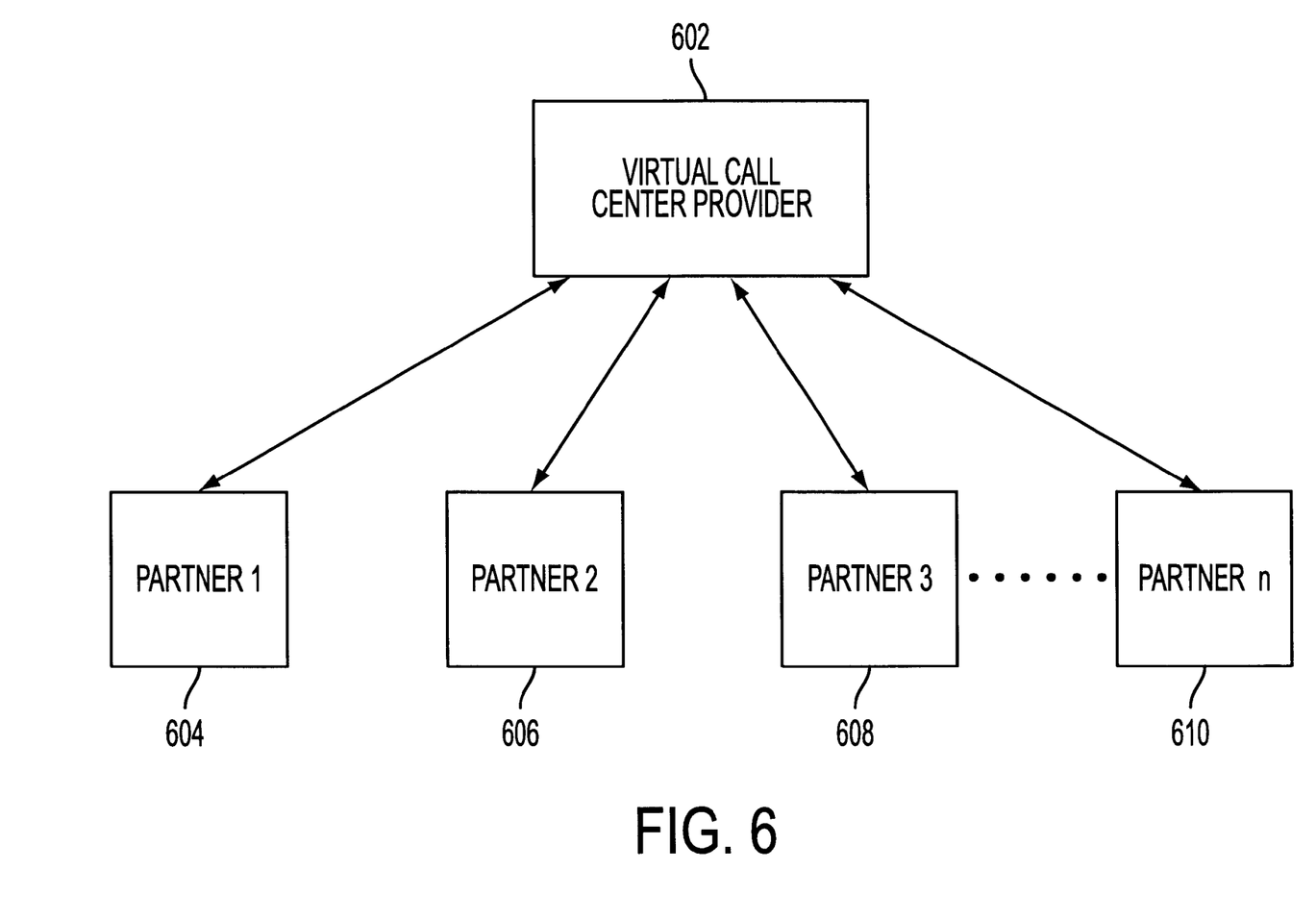
FIG. 6 is a block diagram according to an embodiment of the invention illustrating the partnering concept for servicing of multiple business concerns using the call routing system.

FIG. 6 illustrates the partnering concept of the call routing system. In the preferred embodiment, a virtual call center provider 602 (e.g., a credit card service provider) "partners" with a series of other business concerns, such as merchants or service providers. Thus, the call routing system supports not only the virtual call center provider's service requirements, but also those of partners. The benefit is that costs are spread among the different business concerns so that partners, who otherwise may be unable to finance their own virtual call center, can provide service and marketing heretofore limited to larger, well-capitalized concerns. Moreover, by partnering, the call router system provides cross-marketing or cross-selling opportunities not otherwise feasible. According to the exemplary scenario of FIG. 6, virtual all center provider 602 also supports call routing for partner 1 604, partner 2 606, partner 3 608 and partner n 610.

Overview of a Method for Call Routing

Figure 7:
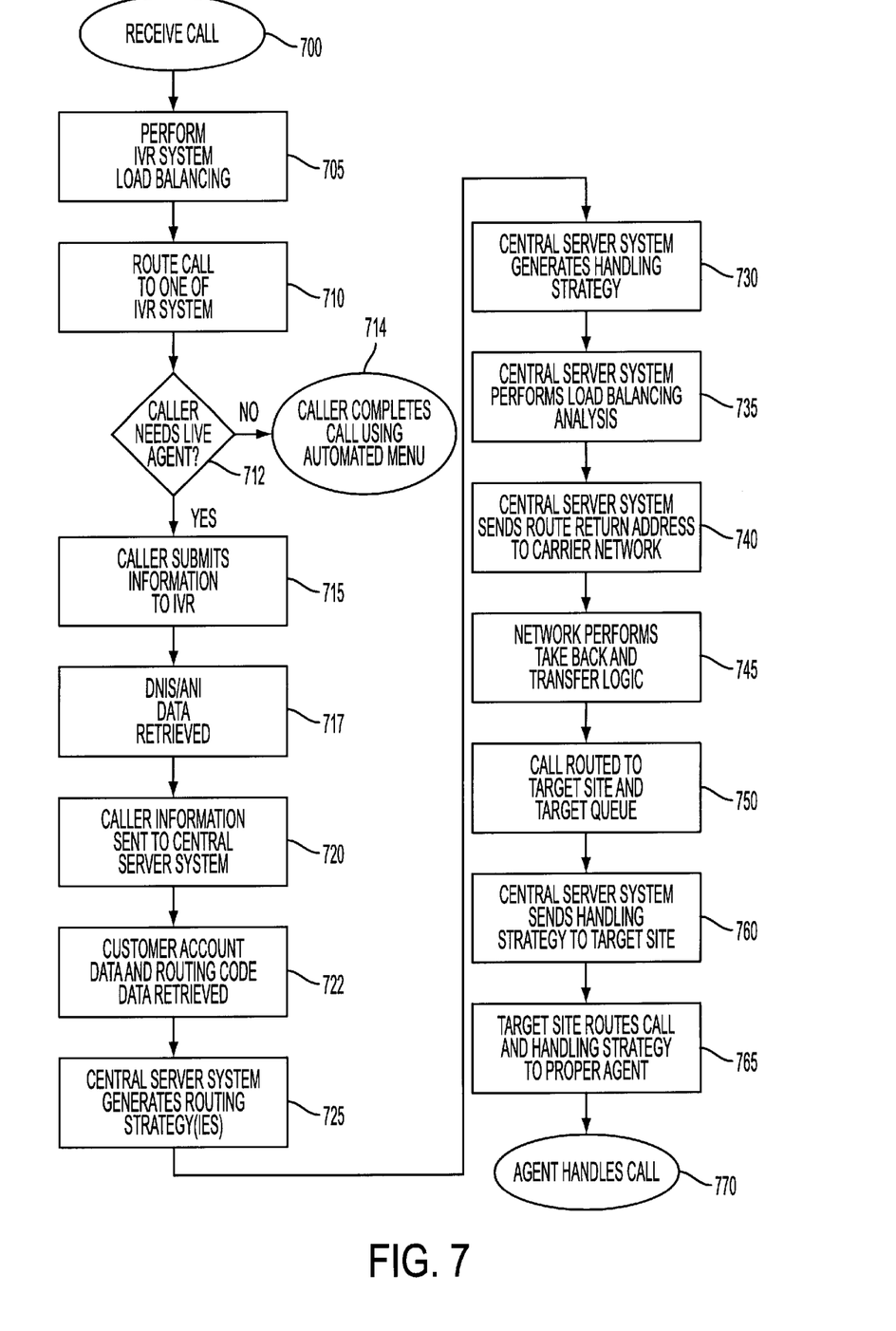
FIG. 7 is a flowchart illustrating a method, according to an embodiment of the invention, for servicing callers using the call routing system.

FIG. 7 is a flowchart illustrating a method for call routing according to one embodiment of the present invention. The call routing system receives a call, according to step 700. Referring to FIG. 1, the call may be routed through LXC 135 to IXC 130, where a route request is passed to central server system 100 through IXC interface 127, indicating that a call has been placed. Next, the call routing system performs IVR system load balancing, according to step 705. In the embodiment illustrated by FIG. 1, central server 100, based on status information received from the IVR banks (blocks 120 and 125), may perform load balancing to determine which of the IVRs should receive the call.

According to step 710, the call is pre-routed to one of the IVR systems. According to decision block 712, the caller may either select automated servicing ("No"), in which case automated servicing and account access will be provided without human intervention, according to step 714. If the caller desires servicing by a live agent ("yes") he/she can indicate that by entering a digit such as "#" or "0". According to step 715, the caller submits information to the IVR device, such as keypad entries for account number, PIN, phone number, etc. According to step 717, the call routing system retrieves DNIS (dialed number identification service) or ANI (automatic number identification) data based on the called number or originating number. As will be further explained in connection with FIG. 10, the call routing system may support toll-free calls to one of several 800 numbers or the like. Certain 800 numbers may be assigned to certain partners or queues, so that calls to partner-specific 800 numbers will be routed directly to those partner queues.

The caller information submitted to the IVR is sent to central server system 100, according to step 720, and the central server system attempts to identify or recognize the account, according to step 722, and retrieves account and/or routing code data. According to step 725, central server system 100 generates a routing strategy based on the caller information. Based on the preroute information and information from the database (see, e.g., customer profile behavior data module 215, routing codes data module 235, and strategies module 230), several routing strategies may be obtained. For example, central server system 100 may determine the caller, who is seeking a limit increase, should be routed to a general queue. Based on demographic and customer profile data, central server 100 may also determine that this caller is a good candidate for proactive servicing for products 2 and 4. In this case, central server system 100 provides a first routing strategy for sending the call to site 1 to an agent qualified for general queue 502 and proactive service queue product 1 and product 2 508 (see FIG. 5). Likewise, a second routing strategy is obtained for sending this call to site 2 to an agent qualified for general queue 522 and proactive service queue product 3 and 4 520. This step may further comprise arbitration logic to determine which of the several candidate routing strategies will be selected.

According to step 730, central server system 100 generates a handling strategy corresponding to each routing strategy. For example, for the first exemplary strategy discussed above, a handling strategy informs the agent that this caller seeks a limit increase and may be interested in product 2. According to step 735, central server system 100 performs load balancing analysis to rationally distribute the call load among available queues (e.g., among the agents staffing call site systems 1–3, modules 145–155, FIG. 1). As mentioned previously, the load balancing analysis is based on substantially real-time status information received from the various components of the call routing system.

According to step 740, central server system 100 provides a route return address to the long distance network (e.g., to IXC 130 through IXC interface 127). The network utilizes so-called take back and transfer™ logic or the like, according to step 745, to take the call from inside the call routing system network and route it to the designated target (e.g., a particular call site system and queue), according to step 750. Those of ordinary skill will appreciate that the present invention is not limited to any particular technology for routing the calls from the IVR banks (blocks 120–125) back through the phone network to the target site, and that so-called take back and transfer technology™ is but one means for accomplishing the desired result.

According to step 760, central server system 100 sends a handling strategy to the target site, which can be presented at an agent workstation (e.g., agent workstation1 324, FIG. 3) for personalized treatment. The target site routes the call and handling strategy to the proper agent, according to step 765, and the agent handles the call, according to step 770.

Strategic Decisioning and Routing Strategies

Figure 8:
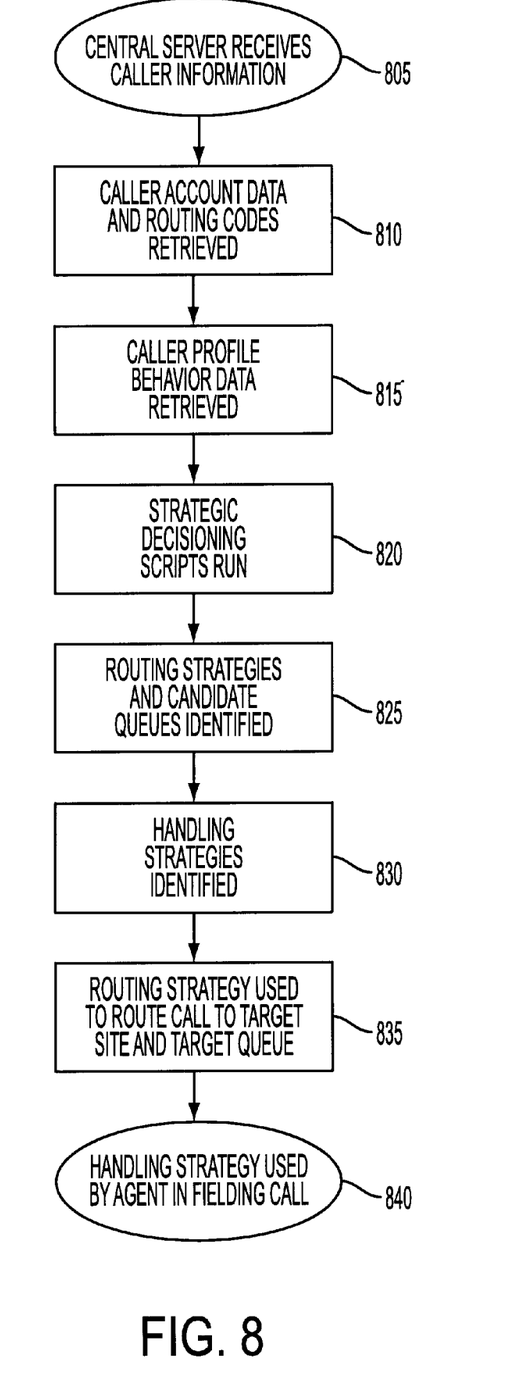
FIG. 8 is a flowchart illustrating a method, according to an embodiment of the invention, for the central server system to prepare routing and handling strategies to facilitate the delivery of a general 800# call to a qualified agent.
Figure 10:
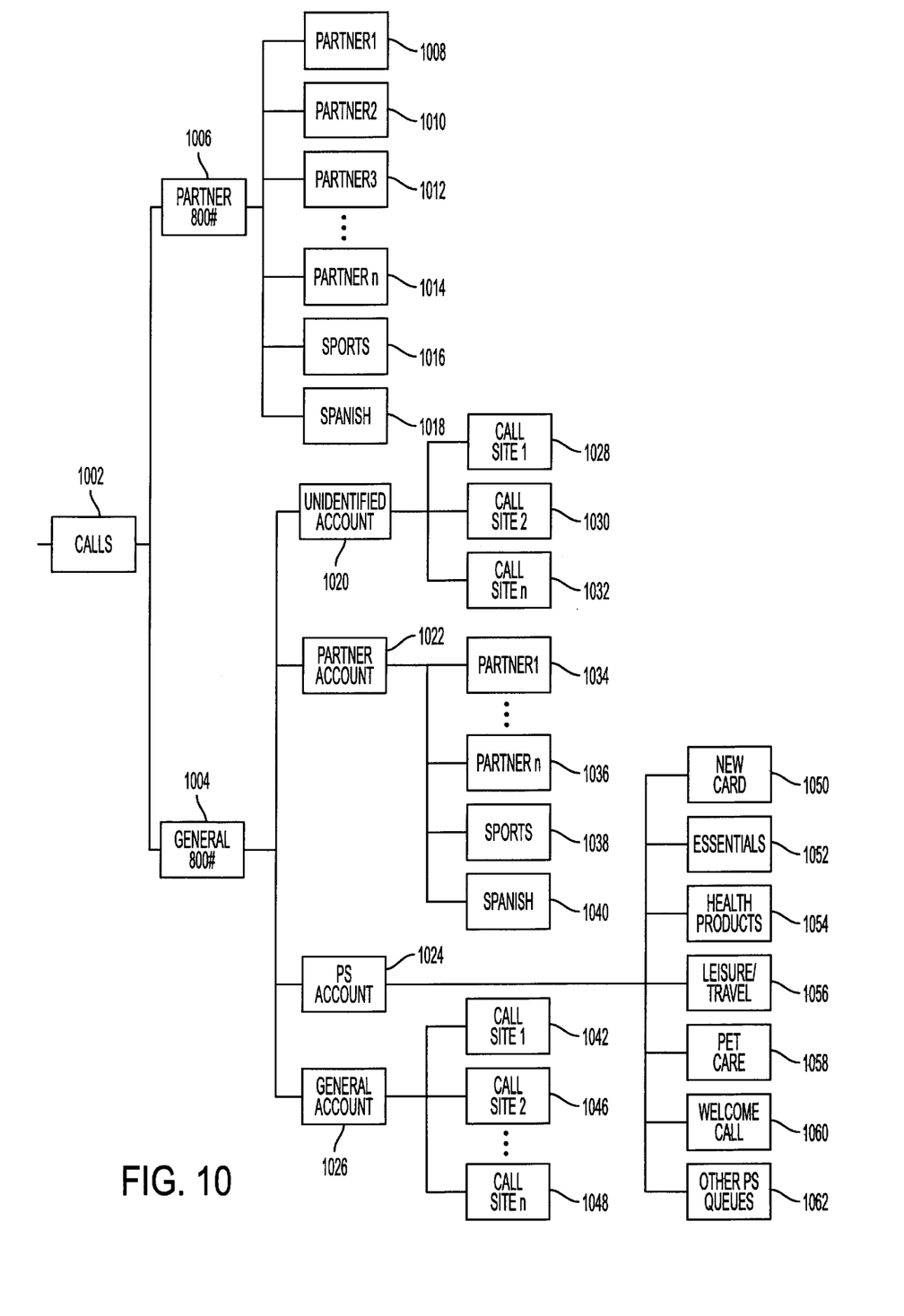
FIG. 10 is a diagram illustrating, according to an embodiment of the invention, the potential routing paths of a call placed to a toll-free number for the call routing system.

FIG. 8 is a flowchart further illustrating the routing strategy generated by central server system 100 to route calls to queues at call site systems when a general 800# is called (see block 1004, FIG. 10). According to step 805, central server system 100 receives preroute information for the call. As previously discussed, this may comprise information such as called number, originating number and data collected by one of the IVR banks, i.e., IVR system1 125 and IVR system2 120. Caller account data and routing codes are retrieved from account lookup data (see, e.g., account lookup data module 220 and routing codes data module 235, FIG. 2), according to step 810. According to step 815, caller profile behavior data (see, e.g., customer profile behavior data module 215, FIG. 2) is retrieved. Based on the retrieved data, strategic decisioning scripts are run, according to step 820, in order to generate one or more routing strategies and candidate queues for the call, as in step 825 (see, e.g., modules 230 and 235, FIG. 2). Generally, a routing strategy generates a proposed queue or queues for a given call and the appropriate return address data. As those of ordinary skill will appreciate, the strategic decisioning scripts will be a function of the composition of the various queues in a given call decisioning system, and are readily developed as a combination of logical statements or so-called "scripts" developed for call routers.

A handling strategy is identified by central server system 100, as in step 830, so that an agent fielding the call is provided information appropriate to the routing strategy. The routing strategy selected is then used to route the call to the proper target site and site queue, according to step 835. Finally, the handling strategy is used by the agent who receives the call, as in step 840.

Figure 9:
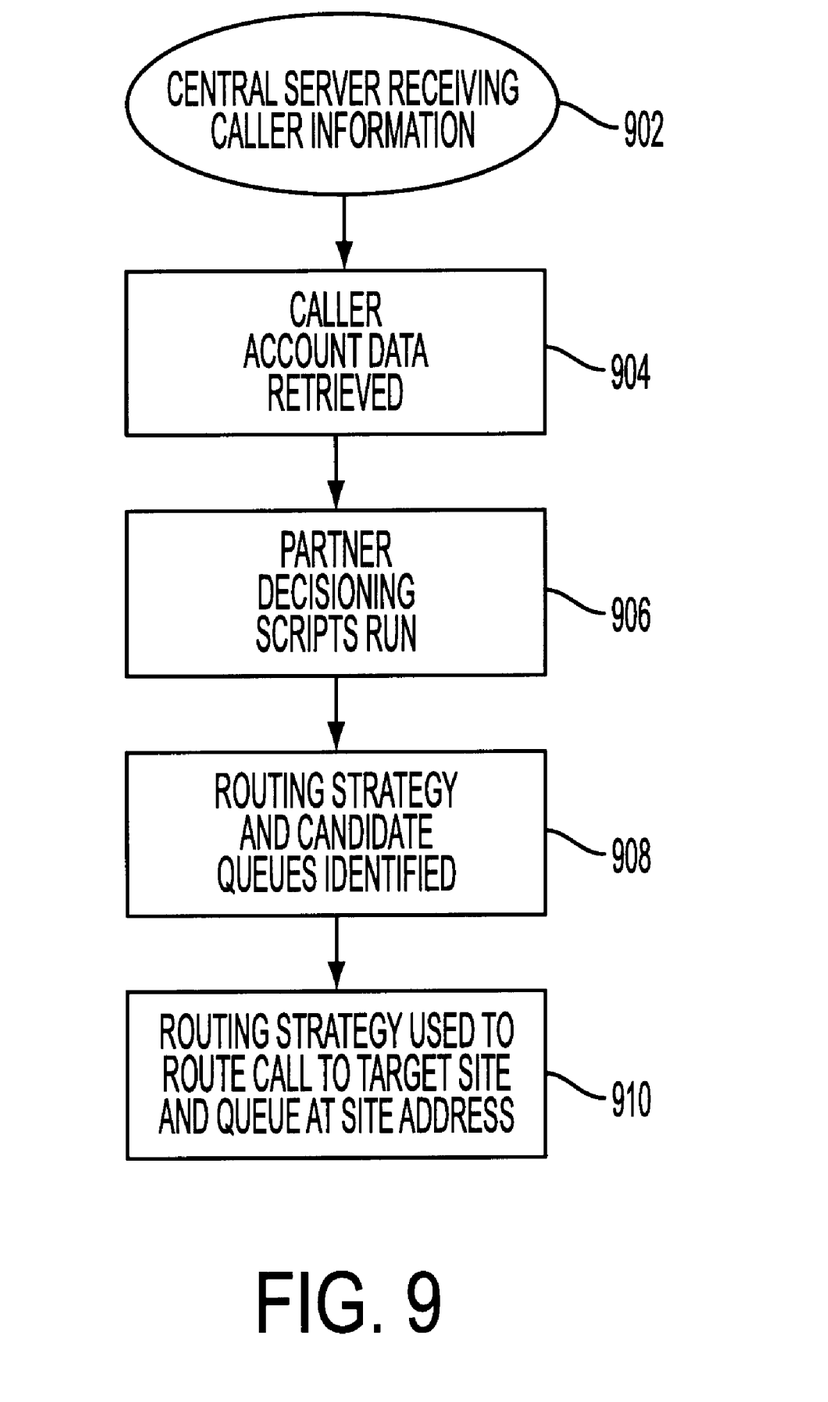
FIG. 9 is a flowchart illustrating a method, according to an embodiment of the invention, for the central server system to prepare a routing strategy for delivery of a partner 800# call to a qualified agent.

FIG. 9 is a flowchart further illustrating the routing strategy generated by central server 100 to route calls when a partner 800# is called (see block 1006, FIG. 10). Central server system 100 receives the caller information, according to step 902. Caller account data is retrieved from the account lookup data, as in step 904. Partner decisioning scripts are run, as in step 906. Since the virtual call center supports not only the so-called main business concern, but also the partners, each partner may provide its own decisioning scripts which could be stored in a module such as strategies module 230 of FIG. 2. According to step 908, one or more routing strategies and candidates queues are identified. According to step 910, the selected routing strategy is sued to route the call to the proper call site and queue.

A Call Flow Diagram for a Call Routing System

FIG. 10 illustrates the various paths that may be taken by a virtual call center according to one embodiment of the invention. Calls 1002 may comprise general 800# calls 1004 or partner 800# calls 1006. Thus, the call routing system may accept toll-free calls with numbers dedicated to specific partners, or a general number for the system. If the dialed number corresponds to a partner 800#, the call is routed to a dedicated partner queue, such as to partner 1 1008, partner 2 1010, partner 3 1012 and partner n 1014. Even when the dialed number corresponds to a partner 800#, queues for special needs such as Spanish 1018 or for proactive selling like sports 1016 (for sports products) may be supported.

If call 1002 corresponds to general 800# 1004, the call routing system logic provides for treatment in one of several categories. Based on preroute information, the call may be treated as partner account 1022, and routed to one of the queues partner 1 1034 through partner n 1036; sports 1038 and Spanish 1040. If preroute information does not permit central server system 100 to identify the account, the call is treated as unidentified account 1020. In this case, the call is forwarded to one of the call site systems, such as call site 1 1028, call site 2 1030 and call site n 1032, so that additional information can be requested from the caller. In one embodiment, such calls will be more or less equally load distributed across the call site center systems (here call site 1 1028 through call site n 1032) and routed to a general queue.

If preroute information determines the caller requires general information about his/her account (e.g., a balance inquiry), then the call is treated as general account 1026 and, will be routed in a load-balanced fashion to one of call site 1 1042, call site 2 1046, and call site n 1048, each of which supports a general queue.

Finally, if the strategic decisioning logic determines that the call is appropriate for proactive servicing, then appropriate routing and handling strategies are generated, and the call may be treated as new card 1050 (new cardmembers), essentials 1052 (home products and the like), health products 1054 (vitamins, supplements and the like), leisure/travel 1056, pet care 1058 (products and services for pets), welcome call 1060 (first-time callers) and other PS queues 1062.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A server-based call routing system, comprising:

a central server system for receiving information of a call and developing a routing control signal and information to assist an agent in handling said call;

said central server system being coupled to a telephony network that is responsive to said routing control signal;

a plurality of call sites with a plurality of queues for receiving said call based on said routing control signal and for receiving said information to assist an agent;

a voice response unit that is external to the telephony network, and that is shared by the plurality of call sites, wherein the central server system preroutes the call to the voice response unit in order to collect at least some of the information of a call prior to developing the routing control signal;

wherein said call sites provide servicing for a plurality of partners, and further wherein said plurality of call sites provides dedicated queues for at least some of the partners.

2. The call routing system of claim 1, wherein each of said call sites is staffed by a plurality of agents and wherein at least one agent is associated with more than one queue.

3. The call routing system of claim 1, wherein one of said plurality of queues is for proactive servicing for suggesting servicing other than that requested by a caller.

4. The call routing system of claim 3, wherein said central server system is adapted to route said call to said queue for proactive servicing based on decisioning logic that predicts whether the caller may be interested in a product or service based on previously stored data comprising customer profile data or customer behavior data.

5. The call routing system of claim 1, wherein at least some of the plurality of partners have their own dedicated phone numbers such that the central server system can recognize that the call is directed to a specific partner based on dialed number information.

6. The call routing system of claim 1, wherein before developing the routing control signal the central server system generates a plurality of candidate routing strategies based on running scripts retrieved from a database, each candidate routing strategy having a target queue, and further wherein the central server system generates the routing control signal based on selection of one of the candidate routing strategies.

7. The call routing system of claim 1, wherein the at least some of the information of a call is used to retrieve information from a call center database in order to develop the routing control signal.

8. The call routing system of claim 7, wherein the routing control signal causes the telephony network to take the call back from the voice response unit for routing to one of the call sites.

9. A method of routing calls in a call routing system, comprising:
   receiving information of a call at a central server system;
   generating a first routing control signal to route the call to an interactive voice response unit shared by a plurality of call sites, wherein the interactive voice response unit is external to an exchange carrier providing the call;
   receiving input from a caller at the interactive voice response unit; and
   generating a second routing control signal for routing the call to one of said plurality of call sites based at least in part on said input;
   wherein the call routing system provides service for a plurality of partners, and further wherein said plurality of call sites provides dedicated queues for at least some of the partners.

10. The method of claim 9, further comprising providing a plurality of agents for staffing the call sites, the agents capable of being associated with multiple queues.

11. The method of claim 10, further comprising the step of assigning multiple queues at each call site.

12. The method of claim 11, wherein said multiple queues comprise at least one queue for proactive servicing for suggesting servicing other than that requested by a caller.

13. The method of claim 9, wherein said step of generating a second routing control signal further comprises predicting a service or product of interest to a caller based on decisioning logic that predicts whether the caller may be interested in a product or service other than that requested by the caller by processing previously stored data.

14. The method of claim 13, further comprising the step of routing the call to an agent at the call site who is associated with a queue for the service or product.

15. The method of claim 9, wherein at least some of the plurality of partners have their own dedicated phone numbers such that the central server system can recognize that the call is directed to a specific partner based on dialed number information.

16. The method of claim 9, further comprising the step of generating a plurality of candidate routing strategies based on running scripts retrieved from a database, each candidate routing strategy having a target queue, and wherein the step of generating a second routing control signal comprises selecting one of the candidate routing strategies.

17. A method of preparing strategies for a call routing system, comprising:
   receiving information of a call at a call routing system, the information including data provided by a voice response unit that is shared by a plurality of call sites and that is external to a telephony network providing the call;
   retrieving data from a database based on said information;
   generating a plurality of routing strategies for said call based on the retrieved data, each routing strategy having an associated target queue;
   performing load balancing based on the status of a plurality of queues; and
   selecting one of said strategies;
   wherein the plurality of call sites provide servicing for a plurality of partners, and further wherein the plurality of call sites provide dedicated queues for at least some of the partners.

18. The method of claim 17, wherein one of said routing strategies provides for sending the call to a queue for proactive servicing for suggesting servicing other than that requested by a caller.

19. The method of claim 17, further comprising the step of generating handling strategy data to assist an agent.

20. The method of claim 19, wherein said handling strategy data informs the agent on how to handle said call.

21. The method of claim 17, wherein at least some of the plurality of partners have their own dedicated phone numbers, and further comprising the step of recognizing that the call is directed to a specific partner based on dialed number information.

* * * * *